United States Patent [19]

Nishihara

[11] Patent Number: 4,500,828
[45] Date of Patent: Feb. 19, 1985

[54] AC GENERATOR

[75] Inventor: Teruyoshi Nishihara, Yokohama, Japan

[73] Assignee: Nissan Motor Company, Limited, Yokohama, Japan

[21] Appl. No.: 493,763

[22] Filed: May 11, 1983

[30] Foreign Application Priority Data

May 24, 1982 [JP] Japan .................. 57-87615

[51] Int. Cl.³ .............................................. H02P 9/14
[52] U.S. Cl. ........................................ 322/46; 322/28; 322/59
[58] Field of Search ............... 322/46, 28, 59, 94; 310/156

[56] References Cited

U.S. PATENT DOCUMENTS

| 3,512,076 | 5/1970 | Larson et al. | 322/46 X |
| 3,566,251 | 2/1971 | Hoglund | 322/46 |
| 3,713,016 | 1/1973 | Lehnhoff | 322/28 |
| 4,015,189 | 3/1977 | Gorden | 322/46 |
| 4,112,320 | 9/1978 | Mohr | 310/156 X |

FOREIGN PATENT DOCUMENTS 56-31814 7/1981 Japan .
56-44214 10/1981 Japan .

Primary Examiner—R. J. Hickey
Attorney, Agent, or Firm—Schwartz, Jeffery, Schwaab, Mack, Blumenthal & Koch

[57] ABSTRACT

This invention relates an AC generator comprising a stator coil, a field coil, a pole core for inducing an output voltage to the stator coil, and a voltage regulator for controlling the output voltage. The field coil is wound in either of such directions as to reduce or increase the magnetic flux formed by the pole core. The voltage regulator controls the output voltage to a predetermined value by passing or breaking the current to the field coil. The voltage regulator thus operates to disconnect the field coil when the output voltage is not within a specified range.

6 Claims, 5 Drawing Figures 4,500,828

AC GENERATOR

BACKGROUND OF THE INVENTION

This invention relates to an AC generator.

There is known a three-phase AC generator as shown in FIGS. 1 and 2 which is broadly used for automobiles. The AC generator of this type has a voltage regulator incorporated therein, which is disclosed e.g. in Japanese Publication of Utility Model Application No. 44214/1981.

FIG. 1 is a cross sectional view showing the construction of the prior-art AC generator which essentially comprises: a rotor 11 comprising a pole core 111 of carbon steel, a field (magnetic field) coil 112, a yoke 113 and a slip ring 114; a stator 12 having a three phase winding and comprising a stator (armature) core 121 and a stator coil 122; a front case 13 for supporting the rotor 11 and the stator 12; a rear case 14; a diode 21 which is supported in the rear case 14; a voltage regulator 3; a fan 15; a pulley 16; a brush holder 17; a brush 18; and a bearing 19.

FIG. 2 is an electric circuit diagram used for the AC generator 1 of FIG. 1, wherein contained in the AC generator 1 are the field coil 112 and the stator coil 122 which are connected so as to provide a three-phase star connection. A full-wave rectifier comprising six diodes 21 is indicated by reference numeral 2.

The voltage regulator 3 for regulating the output voltage of the AC generator 1 to a predetermined value comprises a diode 31 for absorbing the surge current across the field col 112; a darlington transistor 32 for switching the field coil 112; a resistor 33 connected to the base of this darlington transistor 32; a controlling transistor 34 for controlling the switching function of the darlington transistor 32; a Zener diode 35 which detects the output voltage of the AC generator 1 and, when this output voltage is larger than a given level, supplies the current from the AC generator to the base of the transistor 34; and resistors 36 and 37 connected in series for providing a voltage dividing circuit for the output voltage of the AC generator, wherein the voltage dividing point is indicated by reference numeral 38.

The circuit in FIG. 2 additionally includes an ignition switch 4, a battery 5, a load 7 such as a heater or head lights, etc. and a switch 6 to activate the load 7.

In this circuit of FIG. 2, when the key switch 4 is closed to start the engine of the automobile, currents are passed from the battery 5 through the key switch 4 and the resistor 33 to the base of the darlington transistor 32. Thus, the darlington transistor 32 is closed or made conducting and the field current flows from the battery 5 through this darlington transistor 32 to the field coil 112 to excite the pole core 111.

In this state, the engine is started and the rotor 11 is rotated through the pulley 16, whereby an AC output voltage is induced in the stator coil 122 in response to the rotating speed of the rotor 11. The output voltage is rectified by the full-wave rectifier 2. When this rectified output voltage is smaller than a predetermined value, the voltage at the voltage dividing point 38 of the voltage dividing circuit of the resistors 36 and 37 is still low so that the Zener diode 35 is kept non-conducting, wherein the output voltage of the AC generator 1 increases as the rotating speed of the rotor 11 increases.

Thereafter, when the output volage becomes larger than a predetermined value, the voltage at the voltage dividing point 38 of the above-mentioned voltage dividing circuit reaches the point where the Zener diode 35 is made conducting. The current through this Zener diode 35 flows to the base of the controlling transistor 34, so that the transistor 34 is made conducting. At this time, the darlington transistor 32 is made non-conducting, and it causes the field current to the field coil 112 to be turned off thereby decreasing the output voltage of the AC generator 1. When this output voltage is decreased to a predetermined value, the Zener diode 35 and the transistor 34 are made non-conducting again with the darlington transistor 32 conducting. Thus, the field current flows through the field coil 112 to excite the pole core 111, so that the output voltage of the AC generator 1 increases again. The above-described operation is repeated and the output voltage of the AC generator 1 is controlled to a predetermined value. The battery 5 is charged up to a predetermined voltage by this controlled voltage.

However, in such a prior-art AC generator, even when the output voltage is smaller than a predetermined value, the battery is charged with the field current which is always supplied from the battery 5 to the field coil 112. When the load 7 is operated by closing the switch 6 in the state mentioned above, the AC generator 1 has to generate the extra electric power to be consumed by the load 7 in addition to the electric power to be supplied to the field coil 112 to charge the battery. Thus, a higher output generator is required for the AC generator 1, which will become large and heavy, and will increase the production cost.

A primary object of the present invention is to eliminate the above described drawbacks by providing a compact and light-weight AC generator in which the load of the field coil in the generator for power generation can be reduced, and sufficient output voltage required can be obtained using a generator the necessary output power of which is lower than the conventional one. In addition, the adjustment of the generator is easily done with a simplified voltage regulating circuit.

SUMMARY OF THE INVENTION

Briefly discribed, these and other objects of the present invention are accomplished by the provision of an AC generator comprising: a stator coil; a field coil for inducing an output voltage to the stator coil; a pole core made of a permanent magnet such as a ferrite magnet, the magnetic flux formed by the pole core is adjusted by the field coil; and a voltage regulator for controlling the output voltage to a predetermined value by applying or breaking the current to said field coil.

BRIEF DESCRIPTION OF THE DRAWINGS

These and other objects, features and advantages of the present invention will be more apparent from the following description of preferred embodiments, taken in conjunction with the accompanying drawings in which like reference numerals designate similar or corresponding units, components and elements and in which.

DETAILED DESCRIPTION OF PREFERRED EMBODIMENTS

Figure 3:
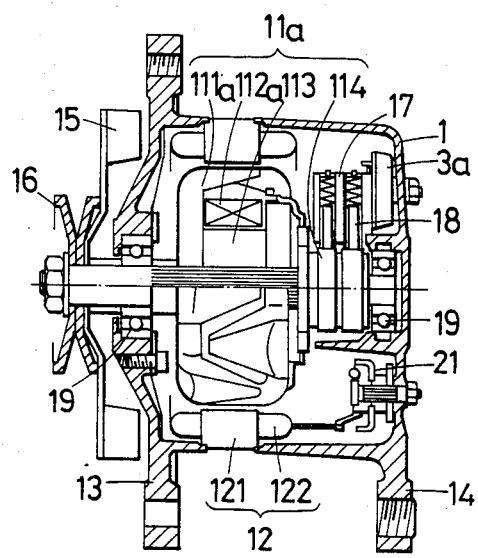
FIG. 3 is a cross sectional view showing the construction of an embodiment of the AC generator to which the present invention is employed.

Referring now to FIG. 3, an AC generator 1 of the present invention comprises a rotor 11a comprising a pole core 111a made of a permanent magnet such as a ferrite magnet, a field coil 112a which is wound in such a direction as to reduce the magnetic flux formed by the pole core 111a, a yoke 113 and a slip ring 114; a stator 12 having a three phase winding and comprising a stator core (armature) 121 and a stator coil 122; a front case 13 for supporting the rotor 11a and the stator 12; a rear case 14; a diode 21 which is supported in the rear case 14; a voltage regulator 3a; a fan 15; a pulley 16; a brush holder 17; a brush 18; and a bearing 19.

Figure 1:
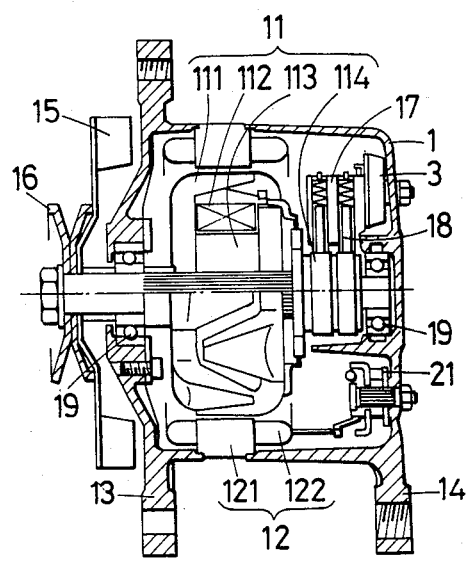
FIG. 1 is a cross sectional view showing the construction of a conventional AC generator.
Figure 2:
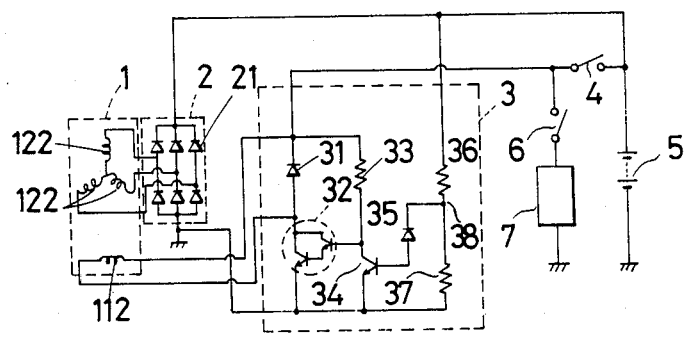
FIG. 2 is an electric circuit diagram of the generator shown in FIG. 1.
Figure 4:
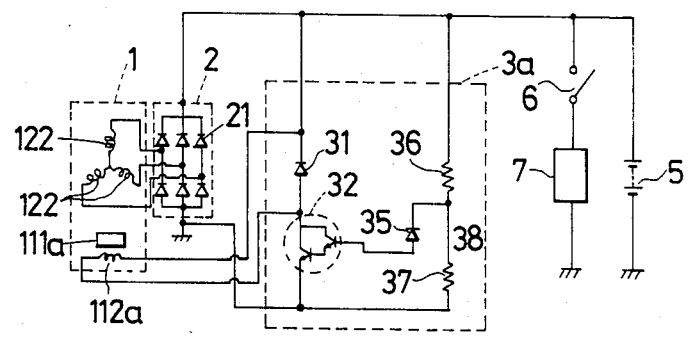
FIG. 4 is an electric circuit diagram of the generator shown in FIG. 3.

Referring to FIG. 4, the voltage regulator 3a surrounded by a broken line is the same as the voltage regulator 3 of FIG. 2 except that the resistor 33 coupled to the base of the darlington transistor 32 and the controlling transistor 34 for controlling the switching function of the darlington transistor 32 are eliminated.

In FIG. 4, a diode 31 for absorbing surge currents is connected across the end terminals of the field coil 112a. A darlington transistor 32 constitutes a switch for passing or breaking the field current to the field coil 112a. A Zener diode 35 detects the output voltage of the AC generator 1 and is made conducting when this output voltage is larger than a given level, thereby supplying the current to the base of the darlington transistor 32. Resistors 36 and 37 connected in series constitute a voltage dividing circuit for the output voltage, wherein the voltage dividing point is indicated by reference numeral 38.

In this circuit, when the engine is started, the Zener diode 35 is kept non-conductng since the voltage at the voltage dividing point 38 is still low enough. Thus, the darlington transistor 32 is also non-conducting and the field current does not flow to the field coil 112a.

However, when the engine is started to rotate the rotor 11a, an AC output volage is induced to the stator coil 122 in accordance with the rotating speed of this rotor 11a since the pole core 111a made of a permanent magnet such as a ferrite magnet forms the magnetic field within the stator coil 122. This output voltage is rectified by a full-wave rectifier 2. The voltage at the voltage dividing point 38 of the voltage dividing circuit in accordance with this rectified output voltage is lower than a predetermined value, so that the Zener diode 35 is kept non-conducting, wherein the output voltage of the AC generator 1 increases as the rotating speed of the rotor increases.

In other words, while the output voltage is lower than a predetermined value, no current flows in the field coil 112a, so that any electric power charged in the battery 5 is not consumed for power generation.

When the rotating speed of the AC generator 1 further increases and the output voltage becomes higher than a predetermined value, the voltage at the voltage dividing point 38 also increases. Hence, the Zener diode 35 is made conducting and the base current is fed to the darlington, transistor 32 through this Zener diode 35 to make the darlington transistor 32 conducting. The field current flows from the battery 5 through this darlington transistor 32 to the field coil 112a.

The magnetic flux produced by the field coil 112a serves to reduce the magnetic flux to be produced within the pole core 111a of the permanent magnet, whereby the output voltage to be generated in the stator coil 122 is decreased.

When this output voltage is decreased down to a predetermined value, the Zener diode 35 is made non-conducting again. Thus, the field current in the field coil 112a is broken and the output voltage of the AC generator 1 increases again.

The operation as described above is repeated and the output voltage of the AC generator 1 is controlled to a predetermined value.

When a switch 6 is closed to operate a load 7 such as a heater or head lamps or the like which requires a large amount of power generation while the output voltage is still lower than a predetermined value, there is no need to supply the current to the field coil 112a. This is because power generation within the AC generator 1 is performed with the aid of the magnetic field formed by the permanent magnet (i.e. the pole core 111a).

Therefore, the load of the AC generator 1 for charging this battery 5 is preferably reduced by the amount of the field current which would be otherwise supplied by the battery 5.

Figure 5:
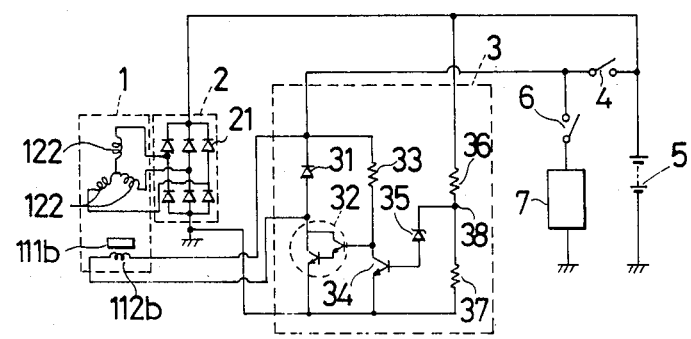
FIG. 5 is an electric circuit diagram showing another embodiment of the invention.

FIG. 5 shows an electric circuit diagram of a second embodiment of the present invention. In this circuit, a pole core 111b made of a permanent magnet such as a ferrite magnet is used in the same manner as in the first embodiment. A field coil 112b is wound in such a direction as to increase the magnetic flux to be formed within the pole core 111b. The other components are the same as those in FIG. 2.

Since the pole core 111b is made of a permanent magnet, the magnetic field is always formed within the stator coil 122.

When the key switch 4 is closed, the base current flows from the battery 5 through the key switch 4 and the resistor 33 to the darlington transistor 32. Thus, this darlington transistor 32 is made conducting and the field current flows in the field coil 112b, thereby producing the magnetic flux within the stator coil 122. This magnetic flux is formed in the same direction as that of the pole core 111b, so that the magnet flux within the stator coil 122 is increased.

In this state, when the engine is started to rotate the rotor 11, an AC output voltage is induced in the stator coil 122 in response to the rotating speed of this rotor 11. This output voltage is rectified by the full-wave rectifier 2.

This output voltage is caused by both of the magnetic fields produced by the pole core 111b and the field coil 112b. However, the maximum output voltage to be produced by the magnetic field of the pole core 111b is set below a predetermined value. The strength of the magnetic field of the permanent magnet for the pole core 111b and the number of windings of the field coil 112b are selected, so that the total output voltage due to the both magnetic fields exceeds a predetermined value.

As the rotating speed of the rotor increases, the output voltage of the AC generator 1 increases up to and above a predetermined value, which causes the voltage at the voltage dividing point 38 in the voltage dividing circuit to increase, whereby the Zener diode 35 and the controlling transistor 34 are made conducting and the darlington transistor 32 are made non-conducting, and the field current is broken.

Although the output voltage by the field coil 112b disappears because the field current does not flow, the output voltage is produced by the pole core 111b. However, this output voltage remains below a predetermined value, so that the output voltage of the AC generator 1 becomes low accordingly.

When this output voltage decreases down to a predetermined value, the Zener diode 35 and the transistor 34 are made non-conducting again with the darlington transistor 32 conducting. Thus, the field current flows in the field coil 112b and the output voltage of the AC generator 1 are increased again to provide the magnetic field in cooperation with the pole core 111b.

The operation as described above is repeated and the output voltage is controlled to a predetermined value.

In this case, as described above, the load of the AC generator 1 which charges this battery 5 is reduced by the amount of the field current which would be otherwise supplied by the battery 5. Accordingly even when the output voltage is lower than a predetermined value, the load 7 such as a heater or head lamps, etc. can be oprated sufficiently by closing the switch 6. This is because the field current for the power generation is supplied merely to supplement the output voltage produced by the magnetic field of the pole core 111b and most of the electric power generated is supplied to the load and the battery 5.

As described above, in these embodiments, according to the present invention, the pole core is made of a permanent magnet. The field coil is provided in the same or opposite direction as the magnetic flux produced by this pole core. The voltage regulator is also provided to control the output voltage to a predetermined value by passing or breaking the current to this field coil. The magnetic flux reduces when the output voltage is over a predetermined value. The magnetic flux increases when the output voltage is below a predetermined value. Therefore, the load contribution of the field coil for the power generation reduces. The number of windings of the field coil also reduces. The diameter of the wires can be small. Consequently, the generator itself can be made compact and light-weight.

In the embodiments of the present invention, a permanent magnet such as a ferrite magnet (its specific gravity is 4–5.) is used as the pole core; therefore, the light-weight pole core can be realized. The weight thereof is approximately half the weight of the prior-art pole core made of carbon steel (its specific gravity is about 8.).

When the field coil is used to reduce the magnetic flux produced within the pole core, the wiring for excitation at the beginning of starting the engine is unnecessary, and the circuit for the voltage regulator can be also simplified.

Although preferred embodiments of the invention are specifically illustrated and described herein, it will be appreciated that many modifications and variations of the present invention are possible in light of the appended claims without departing from the spirit and intended scope of the invention.

What is claimed is:

1. An AC generator comprising:
   a stator coil;
   a pole core, comprising a permanent magnet for creating a magnetic field which produces an output voltage in the stator coil;
   a reverse field coil disposed to reduce the magnetic field when a field current flows therethrough; and
   a voltage regulator responsively connected to the stator coil and connected to the reverse field coil, the voltage regulator having means in series with the reverse field coil for permitting the field current flow through the reverse field coil only when the output voltage is above a predetermined value.

2. An AC generator as claimed in claim 1 wherein the voltage regulator comprises:
   means for dividing the output voltage;
   means, connected to the dividing means, for conducting a control current from the dividing means when the divided output voltage exceeds a predetermined threshold value; and
   means responsively connected to the conducting means and connected in series with the reverse field coil for permitting the field current to pass through the reverse field coil only when the control current flows from the dividing means through the conducting means.

3. An AC generator as claimed in claim 2, wherein: the dividing means comprises a pair of resistors connected in series between a line at the output voltage and a line at ground potential;
   the conducting means comprises a Zener diode; and
   the means for permitting current to pass comprises a Darlington transistor.

4. An AC generator as claimed in claim 1, wherein the permanent magnet comprises a ferrite magnet.

5. A voltage regulator for regulating the output voltage of an AC generator, the AC generator having a reverse field coil, comprising:
   means for dividing the output voltage;
   means connected to the dividing means for conducting a control current from the dividing means only when the divided output voltage exceeds a predetermined threshold value; and
   means responsively connected to the conducting means and connected in series with the field coil for permitting a field current to pass through the reverse field coil only when the control current flows through the conducting means.

6. A voltage regulator as claimed in claim 5, wherein:
   the dividing means comprises a pair of resistors connected in series between a line at the output voltage and a line at ground potential;
   the conducting means comprises a Zener diode; and
   the means for permitting a field current to pass comprises a Darlington transistor.

* * * * *